UNITED STATES PATENT OFFICE.

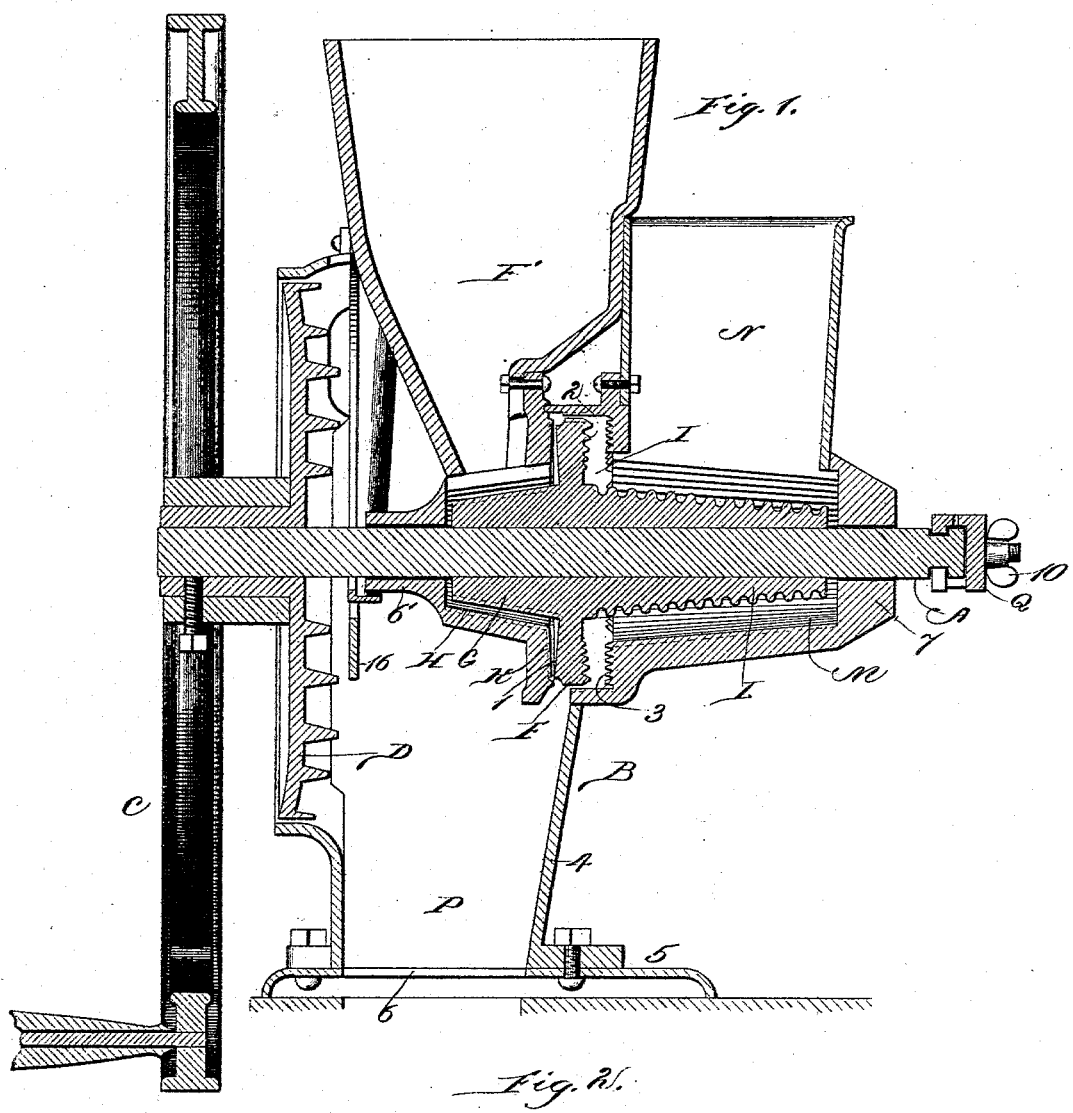

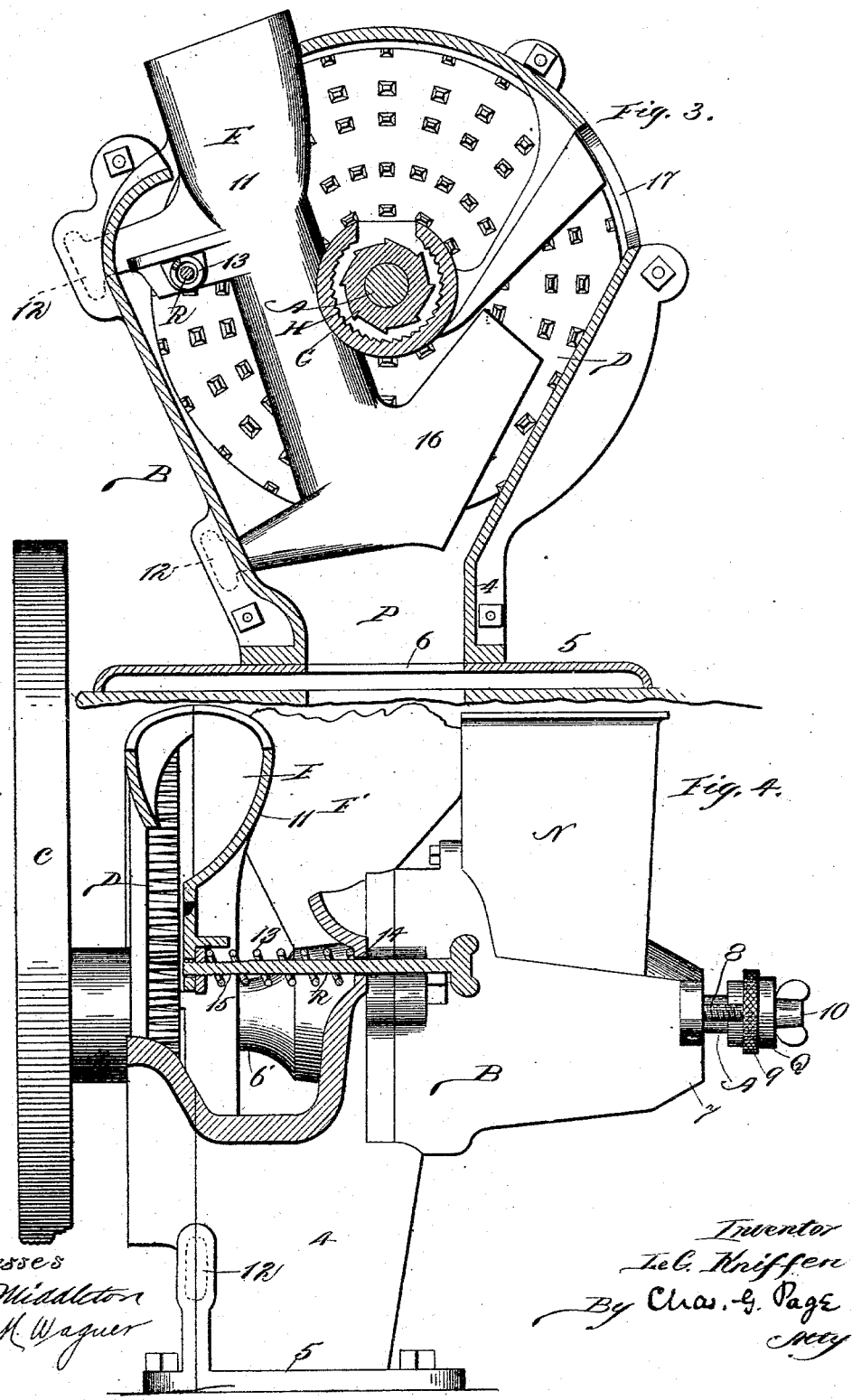

LE GRAND KNIFFEN, OF CHICAGO, ILLINOIS.

COMBINED CORN SHELLING AND GRINDING MACHINE.

SPECIFICATION forming part of Letters Patent No. 514,656, dated February 13, 1894.

Application filed April 11, 1893. Serial No. 469,920. (No model.)

*To all whom it may concern:*

Be it known that I, LE GRAND KNIFFEN, a citizen of the United States, residing at Chicago, in the county of Cook and State of Illinois, have invented a certain new and useful Improvement in a Combined Corn Shelling and Grinding Machine, of which the following is a specification.

My invention relates to machines in which provision is made for both shelling corn and for grinding the shelled corn or other grain.

Prominent objects of my invention are to provide a simple, compact, and highly efficient construction, and to secure various ends and advantages which will be understood from the following description in connection with the drawings.

To the attainment of said objects and other useful ends, my invention consists in matters hereinafter set forth and pointed out in the claims.

In the accompanying drawings,—Figure 1 is a vertical section taken through the machine on a plane passing through and coincident with the axis of the shaft. Fig. 2 is a top plan of the machine on a smaller scale. Fig. 3 is a vertical section taken through the machine on line $x$—$x$ in Fig. 2, so as to show the working face of the corn-shelling disk and the rear side of the corn-shelling hopper in elevation. Fig. 4 is a vertical section on line $y$—$y$ in Fig. 2, it being understood that Figs. 3 and 4 are on a larger scale than Fig. 2.

The rotary shaft A is arranged to extend through the main frame B of the machine, and is provided at one end with means suitable for driving it, such for example as a crank wheel C, or other suitable driving wheel, which can be operated either by hand or other convenient power. The revolving grinding burrs are all secured upon said shaft and desirably confined within the main-frame B, within which latter the stationary grinding surfaces are also arranged in co-operative relationship with their respectively allotted rotary burrs.

The toothed disk or burr D which is secured upon the shaft is adapted for shelling corn, and is arranged at one end of the machine where it preferably serves to close the main shell or frame B at such end, as in Fig. 1.

The hopper E for receiving the ears of corn, is arranged at one side of the axis of the corn-shelling burr, and is formed and located so that a portion of the toothed face of the burr may constitute a portion of one side wall of the hopper as indicated in Fig. 2, whereby when an ear of corn is introduced within the hopper it will be subject to the action of the corn-shelling burr which will revolve the ear and shell the corn therefrom.

The rotary burr F for grinding grain is fixed upon the shaft at a point just back of the corn-shelling hopper and is located at or near the center of the machine. The grain receiving hopper F' rises from the main-frame at a point over the shaft, and discharges the grain into a feeder and crusher formed by a ribbed or toothed conical roll or burr G and the correspondingly formed wall H of a chamber or passage within which the roll or burr G, which is fixed upon the shaft, is arranged for operation. The grain-grinding burr F is arranged at one end of the roll or burr G and revolves within a chamber I which is provided with a suitably ribbed or toothed or other suitable grinding wall K arranged opposite the grinding face 1 of the grain-grinding burr F.

Next in order upon the shaft is a bone or shell crushing or grinding device comprising a feed and crushing roll or burr L which is arranged to revolve within a chamber having a corresponding wall M, and opening at one end into the chamber I wherein the material is ultimately ground between a grinding face 2 on one side of the burr F and a corresponding wall 3 of said chamber I. The material is fed to the bone or shell grinder through a hopper N which rises from one end of the main-frame.

In order to simplify the construction of the main frame or casing B of the machine, and bring such casing within the smallest practical area, the lower upright portion 4 of the casing forms a neck for supporting the upper portion which contains the corn-shelling and grinding elements, and said neck is adapted to provide a discharge passage P common to the corn-shelling and grinding portions of the machine. The neck 4 can by such arrangement be secured upon a base plate 5 having an opening 6 which registers by the passage P. By such arrangement the shelled corn will discharge through passage P when the machine is used for shelling corn. In like manner, grain ground between the grinding faces or fixed and rotary burrs K and F will discharge through said passage, which latter also receives material ground between the grinding faces or fixed and rotary burrs 3 and F. The arrangement for grinding grain and bone or shells or like matters, also serves to render the machine exceedingly compact and simple, since the one burr F can have its side 1 adapted for grinding grain and its side 2 adapted for grinding bone or shells. Said arrangement also enables me to provide a composite burr having conical end portions forming the feed and crushing burr or roll portions G and L, and an intermediate annular flange portion forming a burr F having opposite sides respectively adapted for different kinds of work.

The shaft A is capable of end adjustment, whereby the rotary grinding face of each one of the two distinctive grinding portions of the machine can be adjusted relatively to its allotted fixed grinding face, and also whereby the corn shelling wheel or disk D can be adjusted with reference to a wall arranged opposite its toothed face. Thus for example, the shaft can be adjusted so as to set the grain-grinding face 1 of burr F as closely as may be desired to the fixed face K, or on the other hand an adjustment of the shaft can be made with reference to the desired degree of proximity between the grinding faces 2 and 3.

As a simple way of supporting the shaft, it is arranged to extend through bearings 6' and 7 within the main-frame or shell, and as a means for adjusting it, I provide at one end of the machine a cross-head Q which engages the shaft and which is adjustably supported on rods 8 attached to the main frame. The shaft has a rotary connection with the head Q and the latter is held in adjustment upon the rods by nuts 9 at one side and thumb-nuts 10 at its opposite side. These nuts are fitted upon threaded portions of the rods, and can be turned for the purpose of adjusting the cross-head and thereby effecting an end adjustment on the part of the shaft.

The hopper E for the corn-shelling portion of the machine is constructed with a self-adjusting or yielding side-portion 11 which will yield in conformity with requirements. This yielding side-portion of the corn-shelling hopper is hinged to the main-frame or casing as indicated by dotted lines at 12, in Fig. 3, wherein the section is taken through the machine in a way to expose the rear side of the yielding side portion of the hopper and also show a considerable portion of the corn-shelling side of the wheel or disk D. This said yielding side portion 11 of the corn-shelling hopper is backed by a spring 13 (Figs. 3 and 4) which is arranged about a slide rod R. The rod R is arranged to slide within a bearing 14 in the main-frame or casing and has a threaded end portion 15 arranged to engage a threaded bearing with which the yielding hopper wall portion 11 is provided, by which arrangement the resistance of the spring can be adjusted by adjusting said rod in its connection with the yielding hopper wall.

The ear of corn introduced into hopper E will be revolved and shelled by the operation of the rotary shelling disk, and while the shelled corn will drop into the passage P, the cob will be carried around between the disk and a lower extension 16 of the yielding hopper-side, and will be ultimately thrown out and discharged through an opening 17 (Fig. 3) in the main-frame or shell of the machine.

What I claim as my invention is—.

1. A corn-shelling and grinding machine comprising a casing having a corn-shelling hopper and a discharge passage extending downwardly from the same, a rotary operating shaft extending through the casing, a corn-shelling disk secured upon the shaft and forming one side of the corn-shelling hopper, a grain receiving hopper arranged adjacent to the corn-shelling hopper and communicating with its said discharge passage by way of a grinding chamber, and a grain grinding burr arranged within said grinding chamber and secured upon said shaft, substantially as described.

2. A corn-shelling and grinding machine comprising a main frame or casing, a driving shaft extending through the same, a corn-shelling disk D secured upon the shaft, a hopper E arranged at one side of the shaft and having one of its walls formed by the said corn-shelling disk, a grain-receiving hopper F' arranged over the shaft, a grinding chamber arranged about the shaft and communicating with the grain-receiving hopper, a grinding burr arranged within the grain-grinding chamber, and a discharge passage P common to both the corn-shelling hopper and to the grinding chamber, substantially as described.

3. A corn-shelling and grinding machine comprising the main frame or casing provided with hoppers E and F', and having a side opening 17 for the discharge of cobs and a discharge lower passage P for shelled corn and ground grain, an operating shaft extending through the main frame or casing, a disk D on said shaft, a grinding chamber communicating with passage P and hopper F', and a grinding burr secured upon the shaft and arranged within said chamber, substantially as described.

4. The main-frame or casing provided with three hoppers and a discharge passage common to all three, a rotary driving shaft extending through the casing, a corn-shelling disk secured upon the shaft and forming a portion of a hopper at one end of the machine, a grinding chamber arranged between and common to the two remaining hoppers, and a burr secured upon the shaft and arranged within the grinding chamber and having one side adapted for grinding grain and the opposite side adapted for grinding bone, substantially as described.

5. The main-frame or casing provided with hoppers E, F', and N, the shaft A extending horizontally through the main-frame or casing and adjustable endwise, the corn-shelling disk D secured upon the shaft and forming a portion of hopper E, the grinding chamber I communicating with hoppers F' and N, the burr F secured upon the shaft within said grinding chamber and having grinding faces 1 and 2, substantially as described.

6. The main-frame or casing provided with hoppers F' and N, and containing a grinding chamber I arranged between said hoppers and having oppositely arranged grinding walls K and 3, a rotary driving shaft A extending through said chamber and adjustable endwise, a grinding burr F arranged within the grinding chamber and having opposite side grinding faces 1 and 2 and oppositely extending conical feed and crushing portions G and L, and crushing walls H and M corresponding with said conical extensions of the burr, substantially as described.

<div align="center">LE GRAND KNIFFEN.</div>

Witnesses:
W. D. MIDDLETON,
CHAS. G. PAGE.